(12) United States Patent
Marchand et al.

(10) Patent No.: US 10,291,677 B2
(45) Date of Patent: May 14, 2019

(54) METHOD OF ADAPTIVE DOWNLOADING OF DIGITAL CONTENTS FOR SEVERAL SCREENS

(71) Applicant: Orange, Paris (FR)

(72) Inventors: Herve Marchand, Vern sur Seiche (FR); Eric Bouvet, Montreuil le Gast (FR)

(73) Assignee: ORANGE, Paris (FR)

( * ) Notice: Subject to any disclaimer, the term of this patent is extended or adjusted under 35 U.S.C. 154(b) by 118 days.

(21) Appl. No.: 14/719,990

(22) Filed: May 22, 2015

(65) Prior Publication Data

US 2015/0341412 A1    Nov. 26, 2015

(30) Foreign Application Priority Data

May 22, 2014   (FR) ...................... 14 54635

(51) Int. Cl.
*H04L 29/06*    (2006.01)
*H04L 29/08*    (2006.01)
(Continued)

(52) U.S. Cl.
CPC ............ *H04L 65/602* (2013.01); *H04L 67/10* (2013.01); *H04N 21/23439* (2013.01); *H04N 21/2402* (2013.01); *H04N 21/4438* (2013.01); *H04N 21/44209* (2013.01); *H04N 21/6373* (2013.01); *H04N 21/64769* (2013.01); *H04N 21/6587* (2013.01); *H04N 21/8456* (2013.01)

(58) Field of Classification Search
CPC ... H04L 65/02; H04L 67/10; H04N 21/23439; H04N 21/6587; H04N 21/6373; H04N 21/64769; H04N 21/4438; H04N 21/8456; H04N 21/44209
See application file for complete search history.

(56) References Cited

U.S. PATENT DOCUMENTS

2006/0222008 A1   10/2006   Aaron et al.
2007/0024705 A1   2/2007    Richter et al.
(Continued)

FOREIGN PATENT DOCUMENTS

WO    2011159104 A2   12/2011

OTHER PUBLICATIONS

English translation of French Search Report and Written Opinion dated Jan. 22, 2015 for corresponding French Application No. 1454635, filed May 22, 2014.
(Continued)

*Primary Examiner* — Michael A Keller
*Assistant Examiner* — Jsing Forng Lin
(74) *Attorney, Agent, or Firm* — David D. Brush; Westman, Champlin & Koehler, P.A.

(57) ABSTRACT

A method is provided for managing in a local network the adaptive progressive downloading of digital contents by at least one terminal. The terminal is able to simultaneously receive several digital contents to be played back on a screen. The method includes: obtaining an instantaneous downloading bitrate for the at least one terminal; obtaining a priority for each content to be played back on the terminal as a function of a datum relating to the content on the terminal; and requesting downloading of each content according to its level of quality dependent on the priority obtained for the content.

16 Claims, 3 Drawing Sheets

(51) Int. Cl.
*H04N 21/24* (2011.01)
*H04N 21/442* (2011.01)
*H04N 21/2343* (2011.01)
*H04N 21/443* (2011.01)
*H04N 21/6373* (2011.01)
*H04N 21/647* (2011.01)
*H04N 21/6587* (2011.01)
*H04N 21/845* (2011.01)

(56) References Cited

U.S. PATENT DOCUMENTS

| | | | | |
|---|---|---|---|---|
| 2007/0088852 A1* | 4/2007 | Levkovitz | ........... | H04L 12/1859 709/246 |
| 2009/0185619 A1* | 7/2009 | Taleb | ................ | H04N 21/2335 375/240.02 |
| 2011/0093605 A1* | 4/2011 | Choudhury | ......... | H04L 65/4084 709/231 |
| 2011/0161485 A1 | 6/2011 | George et al. | | |
| 2012/0299973 A1* | 11/2012 | Jaffari | .................. | G09G 3/3208 345/690 |
| 2013/0156407 A1* | 6/2013 | Seok | ........................ | H04N 5/76 386/343 |
| 2013/0254418 A1* | 9/2013 | Zhang | .................... | H04L 65/60 709/231 |
| 2014/0019593 A1* | 1/2014 | Reznik | .................... | H04L 65/60 709/219 |
| 2014/0040498 A1* | 2/2014 | Oyman | ................. | H04W 24/02 709/231 |
| 2014/0068789 A1* | 3/2014 | Watts | .................... | H04W 12/08 726/29 |
| 2014/0219088 A1* | 8/2014 | Oyman | ............ | H04N 21/23439 370/231 |
| 2014/0368734 A1* | 12/2014 | Hoffert | ............. | H04N 5/44591 348/564 |
| 2015/0023404 A1* | 1/2015 | Li | ....................... | H04L 65/4084 375/240.02 |
| 2015/0067105 A1* | 3/2015 | Zhu | ........................ | H04L 65/60 709/219 |
| 2016/0261661 A1* | 9/2016 | Taibi | ................. | H04L 65/605 |
| 2017/0134465 A1* | 5/2017 | Caballero | ............ | H04L 65/601 |

OTHER PUBLICATIONS

French Search Report and Written Opinion dated Jan. 22, 2015 for corresponding French Application No. 1454635, filed May 22, 2014.

* cited by examiner

METHOD OF ADAPTIVE DOWNLOADING OF DIGITAL CONTENTS FOR SEVERAL SCREENS

CROSS-REFERENCE TO RELATED APPLICATIONS

This Application claims priority from and the benefit of French Patent Application No. FR 14 54635, filed May 22, 2014, the content of which is incorporated herein by reference in its entirety.

TECHNICAL FIELD

The present disclosure pertains to the communications of digital multimedia contents, in particular in the form of channels of contents.

The present disclosure deals with a method of adaptive downloading of digital contents for several screens.

The expression "multimedia content" is intended to mean any audio or video content, or more generally any other digital content, hereinafter referred to as digital content. The expressions "multimedia contents channel", or "television channel", are intended to mean a succession of such contents over time.

The present disclosure applies to the consumption of such contents by a terminal, equipped with a screen, connected to a network of Internet type. The term "consumption" is understood to mean here a processing carried out with a view to a playback being performed on a terminal. The processing can in particular include a decoding of the digital content. Consumption is generally understood to mean display on a screen of such a terminal or sound playback.

It deals, in particular, with a method for managing the acquisition of digital contents by one or more terminals able to receive and process simultaneously several contents from a network, and in particular with the adaptation of the bitrate of each of the contents.

BACKGROUND OF THE DISCLOSURE

Access to multimedia content, such as television, from a network of Internet type, is possible today. Television over the Internet allows a user of a terminal, connected to a television content channels server via a telecommunication network, to render, or play back, a digital channel of his choice from among a predetermined list of possible channels.

The terminal generally emits a request destined for a server, indicating the chosen channel and it receives in return a stream of digital data relating to this channel.

A digital channel typically comprises films, videos, or in a more general manner any type of digital content which can be transmitted in the network considered.

The terminal is adapted for receiving these digital contents in the form of multimedia data and for effecting playback thereof. This playback consists in providing at the level of the terminal the digital content in a form accessible to the user. For example, data received corresponding to a video are generally decoded, and then played back at the level of the terminal in the form of a display, or viewing, of the corresponding video with its associated sound track. Hereinafter, the digital content will be regarded as a video and the playback by the terminal, or consumption by the user of the terminal, as a viewing on the screen of the terminal.

The broadcasting of channels of digital contents over the Internet is often based on client-server protocols of the HTTP (standing for Hyper Text Transport Protocol) family. In particular, the downloading in progressive mode of the digital contents, also called streaming, makes it possible to transport and consume the data in real time, that is to say the digital data are transmitted over the network and played back by the terminal as and when they arrive. The terminal typically receives part of the digital data in a buffer memory before playing them back. This mode of distribution is particularly useful when the bitrate at the user's disposal is not guaranteed for the real-time transfer of video.

Adaptive progressive downloading, known as HTTP Adaptative Streaming (HAS for short), makes it possible moreover to broadcast and receive data according to various qualities corresponding for example to various bitrates. These various qualities are described in a parameter file available by downloading on a data server, for example a contents channels server. When the client terminal desires to access a channel of contents, this description file makes it possible to select the appropriate format for the content to be consumed as a function of the bandwidth available, the client terminal's storage and decoding capabilities or else the size of its screen. This type of technique makes it possible in particular to take account of the variations in bandwidth on the link between the client terminal and the contents channels server.

Several technical solutions exist for facilitating the distribution of such a content by streaming, such as for example the proprietary solutions Microsoft Smooth Streaming, Apple HLS, Adobe Http Dynamic Streaming or else the ISO/IEC organization's MPEG-DASH standard which will be described hereinafter. These schemes propose to address to the client one or more intermediate description files, also called documents or digests, containing the addresses of the various segments with the various qualities of the multimedia content.

If a second progressive downloading is launched in parallel with a first, for example by the same terminal, or by another terminal of the same local network, the total bandwidth available for downloading is divided in equal shares between the two downloaded streams. Likewise, the simultaneous downloading of more than two streams will require a division in equal shares in such a way that the same bandwidth is at the disposal of each stream. Indeed, the HTTP protocol is based on principles of equality of access to a resource. The HTTP protocol is in particular based on protocols of TCP-IP type (set of protocols used for the transfer of the data over the Internet) which makes it possible to convey the packets of data between the various terminals and servers and the service gateway. The service gateway which receives the packets of data transported according to TCP-IP does not assign them any priority, thus culminating in an equal sharing of the bandwidth. In particular, if two downloads are launched in parallel by the same terminal, the same algorithm for selecting the quality of the content as a function of the bandwidth available is used, culminating in a sharing in two equal parts of the bandwidth available.

However, several downloaded video data streams intended to be played back on one and the same screen do not necessarily require, from a point of view of the user, the same bitrate. For example, certain video inlaying techniques (known as PIP, standing for PictureInPicture) generally make it possible to display in a small window a second video on the screen. It is desirable, in this context, that the user can assign a bigger bitrate to the main video, to the detriment of the inlaid video. The problem extends to a greater number of videos displayed simultaneously on the screen or on several playback devices of the local network.

According to certain implementations, it is known to adapt the capture of the content to certain parameters chosen by the user: for example, a given channel is encoded, decoded, and therefore played back in a variable quality depending on certain parameters chosen by the user. For example, patent US2007/0024705 (Systems and methods for video stream selection) describes such a mechanism in the context of a mosaic of contents for which the encoding bitrate for a given content is rendered proportional to the size occupied by the window for playback of the content in the mosaic.

In this type of implementation, however, it is the capture of the video which is conditioned by the size of the window in the mosaic. A modification of the size of this window may be followed by a fairly long time for modifying the bitrate of the content to be transported. Moreover, it imposes a modification of the physical conditions of acquisition (capture and compression of video, audio, etc.) of the digital content at the source.

There does not exist, to date, any solution for intelligently sharing the bitrate between several streams downloaded progressively in an adaptive manner (HAS) and played back on terminals of the local network with different playback characteristics, without imposing a modification of the acquisition of the content.

SUMMARY

According to a functional aspect, an exemplary embodiment relates to a method of management in a local network of the adaptive progressive downloading of digital contents by at least one terminal able to simultaneously receive several digital contents to be played back on a screen, the method being characterized in that it comprises the following steps:
 obtaining of an instantaneous downloading bitrate for said at least one terminal;
 obtaining of a priority for each content to be played back as a function of a datum relating to the content;
 obtaining of a bitrate to be associated with each content as a function of the instantaneous downloading bitrate and of the priority obtained;
 determination of a level of quality to be downloaded as a function of the bitrate to be associated with each content;
 requesting downloading of each content according to its level of quality.

Thus, an exemplary embodiment of the disclosure offers the advantage of playing back for each content, or each channel of contents, a quality in relation to the priority which is obtained or calculated on the basis of a certain number of parameters relating to the playback device (in particular the screen of the terminal) and to the content itself, in particular its display on the screen of the terminal. The priority associated with the content can in particular be associated with a characteristic specific to the content (type of content, etc.), or a playback characteristic, for example the disposition or the size of the playback window on the screen of the terminal, or else preferences of the user. The bitrate associated with each content is rendered dependent on this priority coefficient. In contradistinction to the mechanism provided by the prior art, which shares the downloading bitrate in equal shares between the various contents, an exemplary embodiment therefore proposes to pre-transport these contents with a quality adapted to the criteria specific to the user and to his various playback screens. In the context of adaptive streaming (HAS), the final quality of each of the contents can be determined as a function of the possible bitrates indicated by the server in a file of streaming parameters (of digest type): once the priority has been calculated, the most appropriate level in the description file can be chosen to provide playback as close as possible to this priority.

According to a particular mode of implementation, a method such as described hereinabove is furthermore characterized in that the step of obtaining an instantaneous downloading bitrate for said at least one terminal is preceded by the steps of:
 obtaining of an instantaneous total downloading bitrate to be shared between the terminals of the local network;
 reception of a datum relating to said at least one terminal;
 obtaining of the instantaneous downloading bitrate for said at least one terminal on the basis of the instantaneous total downloading bitrate and of the datum received.

According to this embodiment, a total downloading bitrate, available for the set of terminals of the local network, can be shared intelligently between various terminals by assigning them a datum involving a priority. The priority associated with the terminal can relate to its intrinsic characteristics or to a parameter of the user, whether this be his preference data or actions that he has performed earlier; it culminates in intelligent sharing of the available bitrate between the various terminals of the local network which download contents.

According to a second particular mode of implementation, which will be able to be implemented alternatively or cumulatively with the previous one, a method such as described hereinabove is furthermore characterized in that the datum relating to said terminal is characteristic of the screen of the terminal.

Advantageously, this embodiment makes it possible to take into account the relative sizes of the user's various items of equipment: the digital tablet having a limited screen with respect to a television, it is judicious to associate with it one or more lower downloading bitrates for the content or contents to be downloaded on the tablet.

According to a third particular mode of implementation, which will be able to be implemented alternatively or cumulatively with the previous ones, a method such as described hereinabove is furthermore characterized in that the datum relating to said terminal depends on the preferences of a user.

Advantageously, this embodiment makes it possible to take into account the preferences of the user relating to the terminals of his local network: he may desire for example to favor the quality of playback on his digital tablet to the detriment of his computer, etc.

According to a fourth particular mode of implementation, which will be able to be implemented alternatively or cumulatively with the previous ones, a method such as described hereinabove is furthermore characterized in that the datum relating to the content on said terminal relates to the surface area occupied on the screen by the playback.

Advantageously according to this mode, the bitrate available for a terminal is shared intelligently between the contents as a function of the surface area and/or proportion that they occupy on the screen: it is indeed senseless to associate a good quality with a content rendered in PIP inlay mode, and conversely it is important to accord the best possible quality to a content which occupies almost the entire screen.

According to a fifth particular mode of implementation, which will be able to be implemented alternatively or cumulatively with the previous ones, a method such as described hereinabove is furthermore characterized in that the datum relating to the content on said terminal relates to the number of pixels occupied on the screen by the playback.

Advantageously according to this mode, the bitrate available for a terminal is shared intelligently between the contents as a function of the number of pixels that they occupy on the screen: it is indeed senseless to associate a good quality with a content rendered in inlay mode (PIP) occupying a few tens of pixels on the screen, and conversely it is important to accord the best possible quality to a content of high-definition (HD) type intended to occupy almost the entire screen with a high resolution, and therefore a high number of pixels.

According to a sixth particular mode of implementation, which will be able to be implemented alternatively or cumulatively with the previous ones, a method such as described hereinabove is furthermore characterized in that the datum relating to the content on said terminal relates to a preference of the user.

Advantageously according to this mode, the bitrate available for a terminal is shared intelligently between the contents as a function of their type: the user can express his preference for certain types of contents (cinema, sport, etc) with respect to others (documentaries, advertisements, etc.)

According to a seventh particular mode of implementation, which will be able to be implemented alternatively or cumulatively with the previous ones, a method such as described hereinabove is furthermore characterized in that the playback level is chosen in a content description file as the level immediately below the bitrate obtained.

Advantageously according to this mode, the contents description file, for example the digest file according to the MPEG-DASH standard is used to provide a content as close as possible to the expressed needs.

According to an eighth particular mode of implementation, which will be able to be implemented alternatively or cumulatively with the previous ones, a method such as described hereinabove is furthermore characterized in that it comprises a preliminary step of reception and playback of each content at the lowest level of the description file.

Thus, advantageously, the total bitrate is as low as possible for each content at the start of the playback, and can then be adjusted by progressively increasing the bitrate and therefore the quality of the most important contents according to the calculated priority.

According to a ninth particular mode of implementation, which will be able to be implemented alternatively or cumulatively with the previous ones, a method such as described hereinabove is furthermore characterized in that the obtaining of the instantaneous total downloading bitrate is performed on the basis of the bitrates of the various downloaded contents.

This embodiment makes it possible, at a given instant, to simply evaluate the total downloading bitrate, which will be adjusted subsequently as the method according to an exemplary embodiment progresses and as and when the priorities are calculated.

According to a tenth particular mode of implementation, which will be able to be implemented alternatively or cumulatively with the previous ones, a method such as described hereinabove is furthermore characterized in that the obtaining of the priority for each content to be played back takes into account the content encoding scheme.

It is thus possible to take into account the coding effectiveness associated with a digital content: the more effectively the content is compressed, the lower the bitrate which is associated therewith will be for one and the same quality. It is therefore beneficial to accord for example a little less bitrate to the contents which are more effectively compressed, for example by the use of an encoding standard which is more recent and therefore more effective than a previous one (H.265 versus H.264, etc.)

According to a hardware aspect, an exemplary embodiment of the present disclosure also relates to a device for management in a local network of the adaptive progressive downloading of digital contents by at least one terminal able to simultaneously receive several digital contents and to play them back on a screen, the device being characterized in that it comprises:

a module for obtaining an instantaneous downloading bitrate for said at least one terminal;

a module for obtaining a priority for each content to be played back as a function of a datum relating to the content;

a module for obtaining a bitrate to be associated with each content as a function of the instantaneous downloading bitrate and of the priority obtained;

as a function of the bitrate to be associated with each content, a module for determining a level of quality to be downloaded;

a module for requesting downloading each content according to its level of quality.

According to another hardware aspect, an exemplary embodiment also relates to a service gateway comprising a device for managing the adaptive progressive downloading of digital contents, such as described hereinabove.

According to another hardware aspect, an exemplary embodiment relates to a terminal comprising a device for managing the adaptive progressive downloading of digital contents, such as described hereinabove.

According to yet another hardware aspect, an exemplary embodiment deals with a computer program for a domestic gateway comprising the software instructions for controlling the implementation by said gateway of the steps of the method for managing the adaptive progressive downloading of digital contents, such as described hereinabove, when the program is executed by the gateway.

According to yet another hardware aspect, an exemplary embodiment deals with a recording medium readable by a data processor on which is recorded a program comprising program code instructions for the execution of the steps of the method for managing the adaptive progressive downloading of digital contents, such as defined hereinabove.

One or more exemplary embodiments of the present disclosure will be better understood on reading the description which follows, given by way of example and with reference to the appended drawings.

DETAILED DESCRIPTION OF AN EXEMPLARY EMBODIMENT

Figure 1:
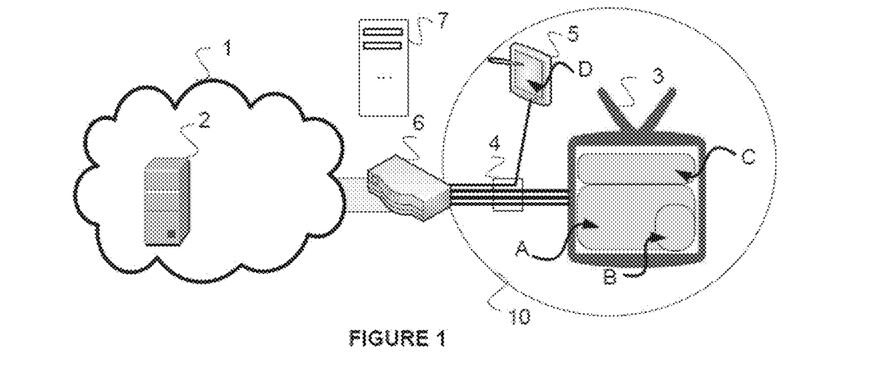
FIG. 1 represents an over the Internet progressive downloading architecture based on the use of the adaptive streaming according to an exemplary embodiment of the present disclosure.

FIG. 1 represents a progressive downloading architecture based on the use of the adaptive streaming according to an exemplary embodiment of the present disclosure.

The terminal 3, for example a connected PC or a television, and the terminal 5, for example a digital tablet, are situated in this example in a local network (LAN, 10) driven by a domestic gateway (6). The context of the local network is given by way of example and could be readily transposed to an Internet network of "best effort" type, a company network, etc.

A digital contents server (2) is sited according to this example in the extended network (WAN, 1) but it could equally be situated in the local network (LAN, 10), for example in the domestic gateway (6) or any other item of equipment capable of hosting such a contents server. The contents server (2) receives for example channels of digital television contents originating from a broadcast television network, not represented, and makes them available to the client terminals. According to another example, the contents server (2) prepares its contents itself and assembles them in the form of channels of television contents before storing them for example on a hard disk.

Conventionally, at least one of the client terminals (3, 5), desires to enter into communication with the contents server (2) so as to receive a contents channel composed of one or more contents (films, documentaries, advertising sequences, etc.) which are sequential over time. The set of data descriptive of these programs is called a program guide, afforded to the user of the terminal (3,5) to aid him in his choice.

It is frequent, in this client-server context, to resort, for exchanging data between the client terminal (3,5) and the server (2), to a technique of adaptive progressive downloading, called "adaptive streaming" (HAS for short), based on the HTTP protocol. This type of technique makes it possible in particular to offer the user a good quality of contents by taking account of the bandwidth variations which may occur on the link between the client terminal (3,5) and the services gateway (6), or between the latter and the contents server (2).

Conventionally, various qualities can be encoded for the same content of a channel, corresponding for example to various bitrates. More generally, the term quality will be employed to refer to a certain resolution of the digital content (spatial, temporal resolution, level of quality associated with the video and/or audio compression) with a certain bitrate. Each level of quality is itself sliced on the contents server into temporal segments (or "fragments" of content).

The description of these various qualities and of the associated temporal segmentation, as well as the content fragments, are described for the client terminal and placed at the disposal thereof via their Internet addresses (URI: Universal Resource Identifier). The set of these parameters (qualities, addresses of the fragments, etc.) is in general grouped together in a parameter file, termed the description file. It will be noted that this parameter file may be a computer file or a set of information descriptive of the content, accessible at a certain address.

The terminal (3,5) possesses its own characteristics in terms of capability for decoding, for display, etc. In a context of progressive adaptive downloading, it can adapt its requests to receive and decode the television contents channel requested by the user to the quality which corresponds best thereto. In our example, if the channels of television contents are available at the bitrates 512 Kb/s (kilobits per second) (Resolution 1, or level 1, denoted N1), 1024 kb/s (N2), 2048 kb/s (N3) and the client terminal has a bandwidth of 3000 kb/s at its disposal, it can request the content at any bitrate below this limit, for example 2048 kb/s. Generally, channel number i (this is for example the index of the ith channel in the service plan of an operator's digital bundle) is denoted "Ci@Nj" with quality j (for example the j-th quality level Nj described in the description file).

The service gateway (6) is in this example a domestic gateway which ensures the routing of the data between the extended network (1) and the local network (10), manages the channels of digital contents by ensuring in particular their reception from the network and their decoding by virtue of the decoders that are assumed here to be integrated into the gateway (6) or into the terminal (3,5). As a variant, the decoders can be sited elsewhere in the extended network (1) or local network (10), in particular at the level of an element of STB (Set-Top-Box) type associated with the television (3).

In this example, to view a content, the terminal (3,5) firstly interrogates the service gateway (6) to obtain an address of the desired description document (7) for the channel of contents (for example, C1). The service gateway (6) responds by providing the terminal with the address of the description file (7). Hereinafter, it will be assumed that this file is a file of digest type according to the MPEG-DASH standard (denoted "C.mpd") and the expression "description file" or "digest" will be referred to interchangeably, depending on the context.

Alternatively, this file may be retrieved directly from a local Internet server or from one external to the local network, or already be situated on the service gateway or on the terminal at the time the request is made.

An exemplary digest file (MPD) in accordance with the MPEG-DASH standard and comprising the description of contents available in three different qualities (N1=512 kb/s, N2=1024 kb/s, N3=2048 kb/s) of the fragmented contents is presented in annex 1. This simplified digest file describes digital contents in an XML ("eXtended Markup Language") syntax, comprising a list of contents in the form of fragments conventionally described between an opening tag (<SegmentList>) and a closing tag (</SegmentList>). In particular, by slicing into fragments, fine adaption to fluctuations in the bandwidth are made possible. Each fragment corresponds to a certain duration ("duration" field) with several levels of quality and makes it possible to generate their addresses (URL—Uniform Resource Locator). This generation is done in this example with the aid of the "BaseURL" elements ("HTTP://server.com") which indicates the address of the contents server and "SegmentURL" which lists the complementary parts of the addresses of the various fragments:

"C1_512 kb_1.mp4" for the first fragment of the content "C1" at 512 kilobits per second ("kb") in the MPEG-4 format ("mp4"), "C1_512 kb_2.mp4" for the second fragment, etc.

Once it has the addresses of fragments corresponding to the desired content, the service gateway (6) undertakes the obtaining of the media fragments via a downloading at these addresses. It will be noted that this downloading takes place here, traditionally, through an HTTP URL, but could also take place through a universal address (URI) describing another protocol (dvb://mysegmentofcontent for example).

It is assumed here that the terminal (3) plays back three contents (C1, C2, C3) described in the digest file (7) and played back on three zones of the television (A, B and C).

Zone A is a rectangular zone occupying the lower three-quarters of the screen;

Zone C is another rectangular zone occupying the upper quarter of the screen;

Zone B is a small square zone inlaid in zone A so as to represent a program as PIP (Picture In Picture), corresponding to a surface area of 15% of the screen.

Thus therefore, globally, window 1 occupies 60% of the screen, window B occupies 15% thereof and window C, 25%.

It is also assumed that the terminal (5) plays back a content (C4) which occupies the entire screen (window D) of the terminal (5).

According to the prior art, the customarily favored strategy is to transport the four streams according to an equal bitrate, independently of their occupancy on the screens.

Figure 3:
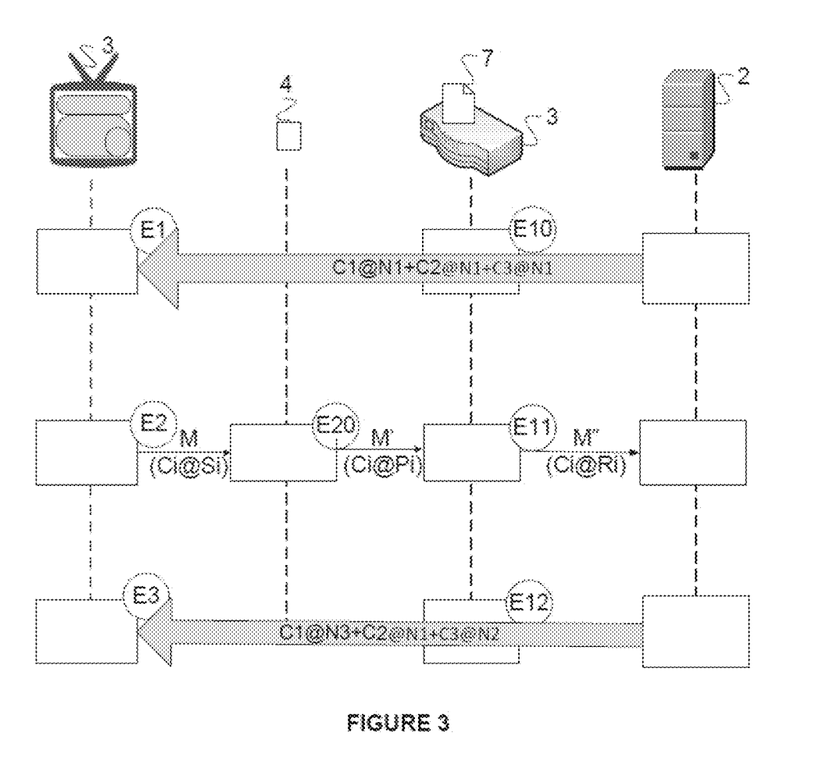
FIG. 3 represents a timechart according to an exemplary embodiment of the disclosure.
Figure 4:
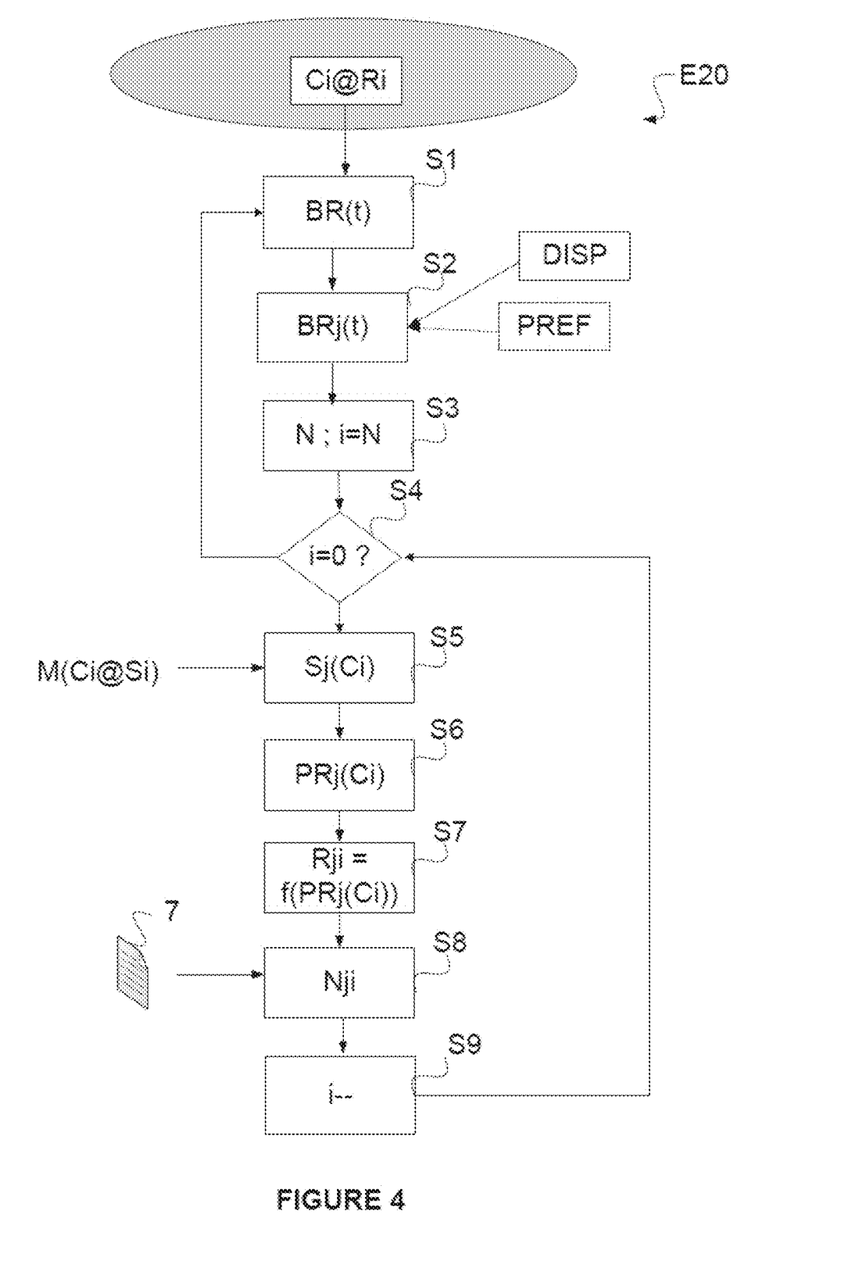
FIG. 4 represents a calculation flowchart for an optimized exemplary embodiment for managing the downloading.

The aim of the downloading management device (4) according to an exemplary embodiment, which will be described subsequently in greater detail with the support of FIGS. 3 and 4, is to intelligently distribute the bitrates according to the sizes of the various windows, or number of pixels, associated with the various contents on the various terminals. This device can be situated in the client post, but in this case operates for a single client terminal, or in the domestic gateway (6) and in this case can apply to several client terminals which are hooked up to it. It can further be situated on another terminal of the local network (LAN, 10) or even on a server in the extended network (WAN, 1) but in this case it is necessary that the server have the possibility of retrieving the information from the local network.

In FIG. 1, this device (4) is represented on the link between the domestic gateway and the terminal (3,5).

It is assumed that the television (3) is designated in the user's preferences with a preferential coefficient of 4 whereas for the tablet this coefficient is 1. The total bitrate being known (it can be acquired or calculated according to diverse methods within the reach of the person skilled in the art and which will be proposed in the subsequent description), the method according to an exemplary embodiment calculates each of the bitrates for each of the terminals.

If the total bitrate available (either on the local network, or at the input of the gateway) is 5 Megabytes per second (5 MB) it will be possible to assign according to this example 4 MB (4096 kB) to the terminal 3 (preferential coefficient of a value 4) and 1 MB to the terminal 5.

Next, for the terminal 3, the method will attempt to assign 60% of the bitrate to the content C1, 15% to C2 and 25% to C3, in accordance with the surface area that they occupy on the screen. It will therefore be possible to assign 2048 kb to C1 (50% of the 4 MB of total bitrate available for the terminal), 1024 kb to C3 (25%), and 512 kb to C2 (12.5%).

For the terminal 5, the method will assign 100% of the total bitrate available for the terminal to the content C4, that is to say 1024 kb.

It will be noted that a part of the total bandwidth available of 4 MB of the client terminal 3 is unused in this case: the three contents aggregating a total bitrate of 3.5 Mb, some bitrate (512 Kb) still remains available, which can be used for example to pre-transport a certain number of channels of contents, that is to say forward them to the gateway, or to the terminal, of the user, with a view to their future playback.

Figure 2:
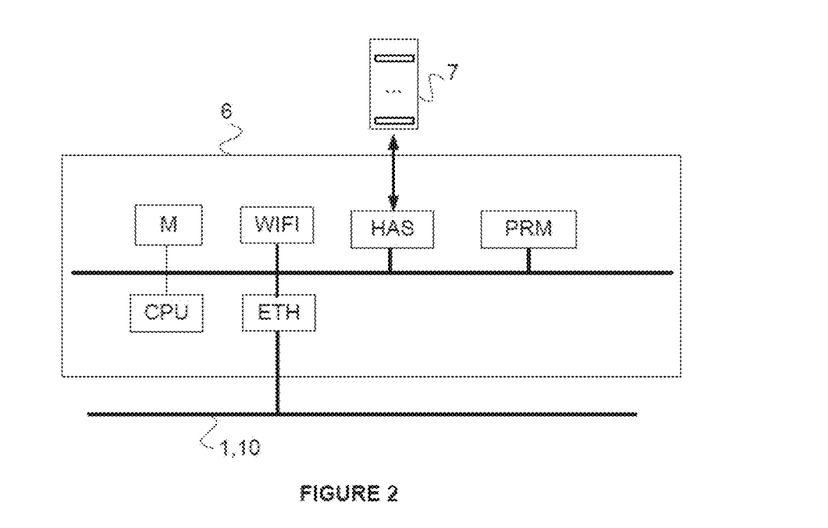
FIG. 2 represents an architecture of a service gateway implementing an exemplary embodiment.

FIG. 2 represents an architecture of a service gateway (6) implementing an exemplary embodiment.

It comprises, conventionally, memories (M) associated with a processor (CPU).

The memories can be of ROM (Read Only Memory) or RAM (Random Access Memory) or else Flash type. The gateway (6) communicates with the local network (1) and the extended Internet network (10) via the Ethernet module (ETH) on the one hand and optionally the WIFI module for a wireless local communication. The service gateway (6) furthermore comprises, in accordance with an exemplary embodiment, a module for managing the adaptive streaming (HAS) able to take into account the information contained in the description files (7) in order to request progressive downloading of one of the channels of contents with one of the qualities proposed in the description file. The gateway according to an exemplary embodiment also comprises a module PRM for managing the downloading, capable of determining at a given instant which priorities are to be assigned to the channels to be pre-transported to the client terminal and to transform these priorities into requests adapted for the HAS module.

This module accesses a file of user parameters. These parameters may be for example the preferences of the user according to the terminals, the weighting coefficients to be used as a function of the coding algorithms associated with the contents, etc., or any means which allows the domestic gateway to ascertain the display characteristics (size of the screen, window) of the content, for example an HTTP request comprising such information in its header, or a message in accordance with the UPnP IGD standard. It is recalled that UPnP, for Universal Plug and Play, is a set of protocols of the "UPnP forum" devoted to the discovery of the equipment in a local network; in this set of protocols, UPnP IGD (for: UPnP Internet Gateway Device) relates more specifically to the services for configuring a network router or a service gateway. An exemplary possible syntax for a request in such a format is proposed hereinbelow; a client informs the router (the service gateway) of the screen size (1920×1080 of the "DeviceScreenSize" tag highlighted in bold) associated with an item of equipment which is in the process of downloading a video from a video server:

```
POST /upnp/b6f78646-53ff-3bee-a91c-
2b7ab958ec0a/WANCommonIFC1.ctl HTTP/1.1
Host: 192.168.1.1
User-Agent: STB IGD client
Content-Length: 409
Content-Type: text/xml
SOAPAction: "urn:schemas-upnp-
org:service:WANCommonInterfaceConfig:1#SetDeviceScreenSize"
Connection: Close
Cache-Control: no-cache
Pragma: no-cache
<?xml version="1.0"?>
<s:Envelope
xmlns:s="http://schemas.xmlsoap.org/soap/envelope/"
s:encodingStyle="http://schemas.xmlsoap.org/soap/encoding/">
<s:Body>
<u:SetDeviceScreenSize xmlns:u="urn:schemas-upnp-
org:service:WANCommonInterfaceConfig:1">
<StreamServerIp>10.194.12.1</StreamServerIp>
<StreamLeaseDuration>328203</StreamLeaseDuration>
<DeviceMacAddress>74:46:a0:ba:f3:1f</DeviceMacAddress>
<DeviceScreenSize>1920x1080</DeviceScreenSize>
</u:SetDeviceScreenSize>
</s:Body>
</s:Envelope>
```

The description files (7) can be recorded for example in the memories M of the gateway or be situated outside.

The service gateway (6) according to an exemplary embodiment can also contain other modules such as a hard disk which is not represented for the storage of the video fragments, a module for controlling access to the contents, a video interface module, other modules allowing it to communicate with the outside via various protocols on various physical links, etc.

It will be noted that the term module can correspond equally well to a software component as to a hardware component or a set of hardware and software components, a software component itself corresponding to one or more computer programs or subprograms or more generally to any element of a program able to implement a function or a set of functions such as described for the modules concerned. In the same manner, a hardware component corresponds to any element of a hardware set able to implement a function or a set of functions for the module concerned (integrated circuit, chip card, memory card, etc.).

FIG. 3 represents a timechart of the exchanges according to an exemplary embodiment.

In this example, a single terminal is concerned in the progressive downloading.

It is assumed that the user of the terminal (3) desires to download three contents C1, C2, C3 originating from the contents server (2) and view them in the three windows A, B, C, of the terminal (3) as explained with the support of FIG. 1.

The priorities management module (4) is represented as an independent entity but could be situated either in the terminal (3) or in the gateway (6) or indeed elsewhere in some other terminal of the local network.

The contents are downloaded one after the other with an initial bitrate which may be, according to two simple examples:
- The bitrate corresponding to the lowest level (N1) in the description file, for example 512 kb/s for the three contents;
- The authorized maximum bitrate (for example, 4 MB) divided by the number of contents (3) to be downloaded, this corresponding in our example to the level N2 (1024 kb/s) for each of the three contents.

It is assumed here that the domestic gateway (6) has at its disposal information relating to the contents, in particular the digest description file (7) which may have been transmitted to it for example by the contents server (2). According to a variant, the digest file (7) is situated directly on the domestic gateway, or on some other terminal of the local network, etc.

During a step E10, the gateway retrieves the three contents by progressive downloading from the contents server (2). This downloading is symbolized by the arrow whose legend indicates the contents received and their level: C1@N+C2@N1+C3@N1.

The terminal receives the contents originating from the gateway and displays, during a step E1, the three contents according to their initial resolution.

Next, during a step E2, an item of information relating to the windows A, B and C (size or number of pixels covered by the window, for example) is transmitted to the management device (4). An example of such information can take the form of a message M containing for example a screen copy on the basis of which the prioritization device will be able to determine the relative size of the windows, or a list of channels to be downloaded with the size of the associated window, in this example a message denoted M(Ci@Si) containing a list of channels to be downloaded with the list of the associated sizes which can take the form:

$$M = \{C3@150 \times 250, C2@25 \times 75, \ldots\}$$

to indicate that the window C3 covers a surface area on the screen of 150×250, the window C2 25×75 pixels, etc.

It will be noted that it is desirable that the prioritization algorithm, in particular if it is on the gateway, receives as input parameter the size of the screen of each terminal in pixels or in centimeters (height×width). This acquisition can be done for example via an http request (request string) of the form:
http://@IP_Gateway:Port/
my_has_content.m3u8?url=@IPServerHas:PortServer
Has//my_has_content.m3u8&height=1080&width=1920

Alternatively, useful data may be situated in the "User Agent" field of the http request: type of smartphone, of tablet, etc.

Alternatively again, the UPnP (IGD) standard may be used to retrieve this kind of information, in accordance with the example provided previously.

In step E20, the management device (4) calculates the priority to be associated with each content: in our example, as it has received an item of information regarding occupancy on the screen of the terminal, it uses this item of information to deduce therefrom a priority Pi for each content Ci that it transmits to the service gateway (6). According to our example, it can assign a priority via a digit from 1 to 100 which will take the value 60 for content C1 to be displayed in window A, 15 for content C2 and 25 for content C3. An example of such information can take the form of a message M'(Ci@Pi) containing a list of channels to be downloaded with the list of associated priorities:

$$M' = \{C2@15, C3@25, C1@60\}$$

On receipt of this message, during step E11, the HAS management device of the gateway in charge of the adaptive streaming establishes a set of requests to retrieve the contents while taking account of their priority: the total bitrate available for the downloads being known to the gateway, it will therefore attempt to assign according to our example 60% of the bitrate to content C1, 15% to C2 and 25% to C3. The role of the gateway HAS management device is to choose the best quality, that is to say the closest lower or equal value of the bitrate in the parameter file (digest), and then to ask the contents server (2) for a download of the various channels of contents at the appropriate level via another message to the contents server denoted M"(Ci@Nj) containing a list of channels to be downloaded with the list of the exact values of the levels requested, chosen in the digest file (7).

For example, if the total bitrate available (either on the local network, or at the input of the gateway) is 4 MB (4096 kB), the HAS management device reads the digest file (7) and consequently assigns 2048 kb (N3) to C1 (50%, i.e. the value immediately available below 60%), 1024 kb (N2) to C3 (25%), and 512 kb (N1) to C2 (12.5%, i.e. the value immediately available below 15%).

It will be noted that the calculation of the bitrate for each content can also be performed in the device (4) for managing the downloading. It suffices that it knows the total bitrate value to be shared between the various contents, this typically being the case if it is situated on the service gateway which knows the total bitrate available for the downloading in the local network, or in a terminal of the local network which knows its total bitrate available for progressive downloading, or in any other server and/or terminal to which this value would have been communicated.

The downloading of the data is symbolized by the solid arrow with the legend C1@N3+C2@N1+C3@N2.

The contents are delivered by streaming by the contents server (2) to the service gateway which transmits them to the terminal (3) which is connected to it. The terminal (3) proceeds during a step E3, similar to step E1, to the playback of the channels C1, C2, C3.

If the user modifies the sizes of windows associated with the contents, the steps described previously (E2, E20, E11, E12 and E3) are strung together again with new priorities associated with the same channels or with new channels.

FIG. 4 represents a calculation flowchart for an embodiment for managing the progressive downloading in a local network.

It is assumed that the HAS management device PRM (4), which in this example is situated on the domestic gateway (6), has at its disposal as input or can access on request:
- the identification of the channels in the course of downloading (Ci) and of the associated bitrate (Ri) (Ci@Ri),
- a list of the contents and associated windows (DISP) in which the client terminal or terminals will display the contents, which windows are received for example in the message (M) presented with the support of FIG. 3, and optionally of the user preferences (PREF) (priority of one terminal with respect to another, etc.)
- a digest file (7) describing the various contents available and the associated levels, in compliance with for example annex 1.

In the course of a first step S1, the management device (PRM, HAS) calculates the total bandwidth available (BR(t)). It can calculate an acceptable approximation thereof by using the current bitrate on the network and various data that it has stored in relation to the previous downloads. For example:
- If the device is situated on the gateway, it can calculate BR(t) as a function of the bandwidth available at the input of the gateway at an instant t; it is considered here that the gateway has the means of assessing the network bitrate at the time t of the calculation. This is a non-predictable variable which evolves over time.
- If the device is situated on the terminal or on the gateway, it can calculate BR(t) as a function of the bitrate already assigned to the downloaded contents, in particular of the contents Ci in the course of viewing by the user and of the bitrate (Ri) which is assigned to them individually, to which is added a safety margin. It is possible to apply for example the following formula:

$$BR(t)=(RC1(t)+MarginA)+(RC2(t)+MarginB)+(RC3(t)+MarginC)$$

where $RCi(t)$ represents the instantaneous bitrate associated with the content Ci in the course of downloading.

To a first approximation, this bitrate can be assumed constant. It is possible to assume, on the contrary, that this downloading bitrate is variable and reevaluated regularly, for example every 5 seconds, or in a cyclic manner. In this example, the bitrate BR(t) can be evaluated in the following manner:

$$BR(t)=\alpha \times BR(t-1)+(1-\alpha) \times DI(t) \text{ where:}$$

$DI(t)$ is the immediate bitrate measured by the terminal or the gateway at the instant t;

$BR(t-1)$ is the estimated bitrate at the previous measurement instant (for example 5 seconds earlier);

$\alpha$ is a value lying between 0 and 1; if it is desired to favor $BP(t-1)$ with respect to $DI(t)$, then we will take for example $\alpha=0.6$, otherwise it is possible to take $\alpha=0.4$.

On initialization of the algorithm, the bitrate BR(0) (estimated bitrate at the start of the download) can take for example the value of the mean downloading bitrate during several downloads performed previously, or the immediate bitrate measured at the end of the downloading of the last file, or any other combination of the times of downloads stored by the terminal in the course of its previous downloads.

During a step S2, the device calculates for each terminal j that desires to obtain a content by streaming an instantaneous downloading bitrate $(BRj(t))$ on the basis of the instantaneous total downloading bitrate $(BR(t))$ and of one or more data relating to the terminal: user preferences PREF (he may favor his tablet over his PC, or his TV over his PC, etc.) or characteristics of the terminal (size of the screen, resolution, etc.) denoted DISP. It will be noted that in the case where a single terminal requests a download, the downloading bitrate for the terminal $(BRj(t))$ may be equal to the total downloading bitrate for the local network $BR(t)$. The bitrate $BRj(t)$ can be expressed simply according to:

$$BRj(t)=[BR(t)*PRIO(j)]/SPr$$

where
- PRIO(j) is the priority assigned to screen j (according to the example of FIG. 1, 4 for the TV (3) and 1 for the tablet (5)).
- SPr is the sum of the priorities assigned to the various terminals which perform downloads.

During a step S3, as a function of certain parameters received from the terminal and the user, a number N of contents to be downloaded is calculated or acquired. In our example, we have a value of N=3 contents to be displayed. This variable can be adjusted as a function of a certain number of other parameters or be fixed. Once the value of the parameter N is chosen, a variable i is initialized with this value N of the number of channels to be pre-transported, and then its value is tested during a step S4 with the aim of executing the following steps for the set of channels of contents to be downloaded.

If the variable i is not zero in the course of step S4, that is to say if there still remain contents to be prepared for downloading, a step S5 is performed in the course of which the module PRM (4) performs a reading of the display data (message M) and optionally of the user preferences relating to the channel: size of the window (S(Ci)), number of pixels occupied by the playback of the content, evolution of this size over time, etc.

A priority calculation is performed in the course of step S6. This priority $PRj(Ci)$ expresses for each content Ci the priority relating to its downloading. According to a simple example, it is possible to assign the priority $PRj(Ci)$ to content i for terminal j in such a way that the set of priorities is equal to 100 (representing the entirety of the size of the screen or of the set of screens if several terminals perform a download). Alternatively, it is possible to calculate the total number of pixels (NbPixelsScreen) occupied on the screen by the various windows (A,B,C,D) associated with the various contents (C1, C2, C3,C4), and then evaluate the priority according to:

$$PRj(Ci)=[(NBPixelsOccupiedByCi)/(NBPixelsScreenj)]$$

where
NBPixelsOccupiedByCi is the number of pixels occupied by content i on screen j
NBPixelsScreenj is the total number of pixels of screen j The calculation can moreover be weighted by the type of content and of channel selected according to the user's preferences, the type of coding used for the content, etc. If, for example, it is registered in the user's preferences that he has a preference for sports channels, the channel C1, which is of this type, may receive an additional weighting representative of its higher priority of selection by the user.

Once this calculation of priorities has been performed, it remains, during a step S7, to multiply for example each of them by the bitrate calculated previously (BRj) for terminal j to obtain the bitrate actually desired for content i. Conventionally in the context of HAS, the closest lower bitrate will be chosen in the descriptive file in the course of a step S8: thus, if the calculation culminates in 278 kb/s and the bitrates offered in the digest are respectively 256, 312, 524 kb/s, the bitrate immediately below 278 will be chosen, that is to say 256. The max bitrate per content can be calculated for example as:

$$Rj(Ci)=PRj(Cj)*BRi(t)/100$$

$$Rmax(Ci)>=(Rj(Ci)+Margin\_Ci)$$

Naturally, any variant within the reach of the person skilled in the art is conceivable in this calculation: intervention of other parameters, limitation of the number of pre-transported channels, priority registered directly in the digest, etc.

If all the bitrates have been calculated for all the contents, that is to say if the variable i equals zero in the course of a step S4, then the program can recommence at step S1 by taking into account new external parameters (action of the user on the windows, variation of the instantaneous total bitrate BR(t), etc.) and a new bitrate BRj(t) can be calculated respectively for each terminal that desires to download one or more contents.

Annex1: exemplary digest file

```
<?xml version="1.0"?>
<MPD xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011
DASH-MPD.xsd"
type="dynamic" profiles="urn:mpeg:dash:profile:isoff-live:2011">
<Representation id="0" codecs="avc1" mimeType="video/mp4"
width="1024" height="768" startWithSAP="1" bandwidth="46986">
<BaseURL>HTTP://server.com/</BaseURL>
<!-- Content C1 at N1=512kb -->
<SegmentBase>
 <Initialization sourceURL="C1_15sec_512kb/C1_512kbit_dash.mp4"/>
</SegmentBase>
<SegmentList duration="10">
 <SegmentURL media="C1_512kb_1.mp4"/>
 <SegmentURL media=" C1_512kb _2.mp4"/> ....
</SegmentList>
<!-- Content C1 at N2=1024kb -->
<SegmentBase>
 <Initialization sourceURL="C1_15sec_500kbit/C1_1024kbit_dash.mp4"/>
</SegmentBase>
<SegmentList duration="10">
 <SegmentURL media="C1_512kb_1.mp4"/>....
</SegmentList>
<!-- Content C1 at N3=2048kb -->
<SegmentBase>
 <Initialization sourceURL="C1_15sec_512kb /C1_2048kbit_dash.mp4"/>
</SegmentBase>
<SegmentList duration="10">
```

Annex1: exemplary digest file

```
 <SegmentURL media="C1_2048kb_1.mp4"/>...
</SegmentList>
<!-- Content C2 at N1=512kb -->
<SegmentBase>
 <Initialization sourceURL=" C2_15sec_500kbit/C2_512kbit_dash.mp4"/>
</SegmentBase>
<SegmentList duration="10">
 <SegmentURL media=" C2_512kb_1.mp4"/> ....
</SegmentList>
<!-- Content C2 at N2=1024kb -->
<SegmentBase>
 <Initialization sourceURL="C2_15sec_500kbit/C1_1024kbit_dash.mp4"/>
</SegmentBase>
<SegmentList duration="10">
 <SegmentURL media="C2_1024kb_1.mp4"/>....
</SegmentList>
<!-- Content C2 at N3=2048kb -->
<SegmentBase>
 <Initialization sourceURL="C2_15sec_500kbit/C1_2048kbit_dash.mp4"/>
</SegmentBase>
<SegmentList duration="10">
 <SegmentURL media="C1_2048kbit_1.mp4"/>...
</SegmentList>
 ....
</SegmentList>
</MPD>
```

It goes without saying that the embodiment which has been described hereinabove has been given purely by way of wholly non-limiting indication, and that numerous modifications may easily be made by the person skilled in the art without however departing from the scope of the invention.

What is claimed is:

1. A method comprising:
  managing, by a managing device in a local network, an adaptive progressive downloading of several digital contents by at least one terminal in the local network able to play back at least one of said several digital contents on a display screen, said contents being available at different levels of quality, wherein managing comprises:
  receiving a request from the at least one terminal to receive at least one of said digital contents over the local network;
  downloading each of the at least one of said digital contents at a lowest level of quality contained in a content description file, or at a quality corresponding to an initial bitrate divided by the number of contents, such that each content can be preliminarily received and played back by the at least one terminal at an initial level of quality;
  obtaining an instantaneous downloading bitrate for said at least one terminal;
  calculating a priority for each content of the several digital contents to be played back on the at least one terminal as a function of at least an occupancy of the playback on the screen of the terminal;
  calculating a level of quality for each content as a function of the priority obtained for said content and said instantaneous downloading bitrate;
  transmitting a request to download each content of the several digital contents from a content server according to the calculated level of quality;
  downloading from the content server each content of the several digital contents from the content server according to the respective level of quality for that content; and transmitting the downloaded several digital contents simultaneously to the at least one terminal according to the respective levels of quality for the several digital contents.

2. The method according to claim 1, wherein obtaining an instantaneous downloading bitrate for said at least one terminal is preceded by:
obtaining an instantaneous total downloading bitrate to be shared between the terminals of the local network;
reception of a datum relating to at least one terminal; and
obtaining the instantaneous downloading bitrate for said at least one terminal on the basis of the instantaneous total downloading bitrate and of the datum received.

3. The method according to claim 2, wherein the datum relating to said terminal is characteristic of the screen of the terminal.

4. The method according to claim 2, wherein the datum relating to said terminal depends on the preferences of a user.

5. The method according to claim 1, wherein the occupancy of the playback on the screen of the terminal relates to the surface area occupied on the screen by the playback.

6. The method according to claim 1, wherein the occupancy of the playback on the screen of the terminal relates to the number of pixels occupied on the screen by the playback.

7. The method according to claim 1, wherein the priority for each content is also a function of a preference of the user.

8. The method according to claim 1, wherein the act of calculating the level of quality comprises choosing the level of quality in the content description file according to the following acts:
obtaining a bitrate to be associated with the content as a function of the instantaneous downloading bitrate and of the priority obtained;
determining the level of quality to be downloaded as being the level immediately below that of the bitrate to be associated with the content.

9. The method according to claim 1, wherein the obtaining of the instantaneous downloading bitrate is performed on the basis of the bitrates of the various downloaded contents.

10. The method according to claim 1, wherein priority for each content is also a function of a content encoding scheme.

11. A device comprising:
a non-transitory computer-readable medium comprising instructions stored thereon;
a processor configured by the instructions to perform acts comprising:
managing in a local network of adaptive progressive downloading of several digital contents by at least one terminal in the local network able play back at least one of said several digital contents on a display screen, said contents being available at different levels of quality, wherein the managing comprises:
receiving a request from the at least one terminal to receive at least one of said digital contents over the local network;
downloading each of the at least one of said digital contents at a lowest level of quality contained in a content description file, or at a quality corresponding to an initial bitrate divided by the number of contents, such that each content can be preliminarily received and played back by the at least one terminal at an initial level of quality;
obtaining a total downloading bitrate for said terminal;
calculating a priority for each content of the several digital contents to be played back on the at least one terminal as a function of at least an occupancy of the playback on the screen of the terminal;
calculating a level of quality for each content as a function of the priority obtained for said content and said total downloading bitrate;
transmitting a request to download each content of the several digital contents from a content server according to the calculated level of quality;
downloading from the content server each content of the several digital contents from the content server according to the respective level of quality for that content; and
transmitting the downloaded several digital contents simultaneously to the at least one terminal according to the respective levels of quality for the several digital contents.

12. A service gateway comprising the device for managing the adaptive progressive downloading of digital contents according to claim 11.

13. A terminal comprising the device for managing the adaptive progressive downloading of digital contents according to claim 11.

14. A non-transitory computer-readable storage medium comprising a computer program stored thereon for a managing device, the program comprising software instructions for controlling implementation by the managing device of a method for managing in a local network an adaptive progressive downloading of several digital contents by at least one terminal in the local network able to play back at least one of said several digital contents on a display screen, when the program is executed by a processor of the managing device, said contents being available at different levels of quality, and wherein managing comprises:
the managing device receiving a request from the at least one terminal to receive at least one of said digital contents over the local network;
the managing device downloading each of the at least one of said digital contents at a lowest level of quality contained in a content description file, or at a quality corresponding to an initial bitrate divided by the number of contents, such that each content can be preliminarily received and played back by the at least one terminal at an initial level of quality;
the managing device obtaining an instantaneous downloading bitrate for said at least one terminal;
the managing device calculating a priority for each content of the several digital contents to be played back on the at least one terminal as a function of at least an occupancy of the playback on the screen of the terminal;
the managing device calculating a level of quality for each content as a function of the priority obtained for said content and said instantaneous downloading bitrate;
the managing device transmitting a request to download each content of the several digital contents from a content server according to the calculated level of quality;
the managing device downloading from the content server each content of the several digital contents from the content server according to the respective level of quality for that content; and
the managing device transmitting the downloaded several digital contents simultaneously to the at least one terminal according to the respective levels of quality for the several digital contents.

15. The method according to claim 1, wherein the occupancy of the playback on the screen of the terminal relates to a size of a window on the screen of the at least one terminal associated with each of the several digital contents.

16. The method of claim 1, further comprising:

obtaining a respective bitrate associated with each content of the several digital contents as a function of the instantaneous downloading bitrate for the at least one terminal and of the priority obtained for that content; and for each content to be downloaded, determining the level of quality for that content as a function of the bitrate associated with that content.

* * * * *